(12) United States Patent
Jiang et al.

(10) Patent No.: US 7,415,152 B2
(45) Date of Patent: Aug. 19, 2008

(54) METHOD AND SYSTEM FOR CONSTRUCTING A 3D REPRESENTATION OF A FACE FROM A 2D REPRESENTATION

(75) Inventors: Dalong Jiang, Beijing (CN); Hong-Jiang Zhang, Beijing (CN); Lei Zhang, Beijing (CN); Shuicheng Yan, Hong Kong (CN); Yuxiao Hu, Urbana, IL (US)

(73) Assignee: Microsoft Corporation, Redmond, WA (US)

( * ) Notice: Subject to any disclaimer, the term of this patent is extended or adjusted under 35 U.S.C. 154(b) by 457 days.

(21) Appl. No.: 11/118,116

(22) Filed: Apr. 29, 2005

(65) Prior Publication Data

US 2006/0245639 A1    Nov. 2, 2006

(51) Int. Cl.
*G06K 9/00* (2006.01)
(52) U.S. Cl. ................. 382/154; 382/118; 382/280; 345/473
(58) Field of Classification Search ................. 382/154
See application file for complete search history.

(56) References Cited

U.S. PATENT DOCUMENTS

| | | | | |
|---|---|---|---|---|
| 5,432,864 | A * | 7/1995 | Lu et al. | 382/118 |
| 6,044,168 | A * | 3/2000 | Tuceryan et al. | 382/118 |
| 6,256,047 | B1 * | 7/2001 | Isobe et al. | 345/473 |
| 6,381,346 | B1 * | 4/2002 | Eraslan | 382/118 |
| 6,633,655 | B1 * | 10/2003 | Hong et al. | 382/118 |
| 6,947,579 | B2 * | 9/2005 | Bronstein et al. | 382/118 |

OTHER PUBLICATIONS

Gross, R., J. Shi and J. Cohn, "Quo Vadis Face Recognition?," Third Workshop on Empirical Evaluation Methods in Computer Vision, 2001, 14 pages.
Sim, Terence, Simon Baker and Maan Bsat, "The CMU Pose, Illumination, and Expression (PIE) Database," Appeared in the 2002 International Conference on Automatic Face and Gesture Recognition, pp. 1-6.
Kanade, Takeo, "Picture Processing System by Computer Complex and Recognition of Human Faces," Nov. 1973, Department of Information Science Kyoto University, 148 pages.

(Continued)

*Primary Examiner*—Samir A Ahmed
*Assistant Examiner*—Aklilu k Woldemariam
(74) *Attorney, Agent, or Firm*—Perkins Coie LLP

(57) ABSTRACT

A method and system for generating 3D images of faces from 2D images, for generating 2D images of the faces at different image conditions from the 3D images, and for recognizing a 2D image of a target face based on the generated 2D images is provided. The recognition system provides a 3D model of a face that includes a 3D image of a standard face under a standard image condition and parameters indicating variations of an individual face from the standard face. To generate the 3D image of a face, the recognition system inputs a 2D image of the face under a standard image condition. The recognition system then calculates parameters that map the points of the 2D image to the corresponding points of a 2D image of the standard face. The recognition system uses these parameters with the 3D model to generate 3D images of the face at different image conditions.

16 Claims, 6 Drawing Sheets

OTHER PUBLICATIONS

Jebara, Tony S., "3D Pose Estimation and Normalization For Face Recognition," May 1996, Thesis Paper, Department of Electrical Engineering, McGill University, © 1995 Tony S. Jebara, 138 pages.

Romdhani, Sami, Volker Blanz and Thomas Vetter, "Face Identification by Fitting a 3D Morphable Model Using Linear Shape and Texture Error Functions," Appeared in the European Conference on Computer Vision, 2002, © Springer-Verlag Berlin Heidelberg 2002, pp. 1-15.

Lam, Kin-Man and Hong Yan, "An Analytic-to-Holistic Approach for Face Recognition Based on a Single Frontal View," IEEE Transactions on Pattern Analysis and Machine Intelligence, vol. 20, No. 7, Jul. 1998, © 1998 IEEE, pp. 673-686.

Phillips, P. Jonathon, Patrick Grother, Ross J. Michaels, Duane M. Blackburn, Elham Tabassi and Mike Bone, "Face Recognition Vendor Test 2002," Evaluation Report, Mar. 2003, NISTIR 6965, 56 pages.

Yan, Shuicheng, Mingjing Li, Hongjiang Zhang and Qiansheng Cheng, "Ranking Prior Liklihood Distributions for Bayesian Shape Localization Framework," Proceedings of the Ninth IEEE International Conference on Computer Vision (ICCV 2003), 2003 IEEE, 8 pages.

Riklin-Raviv, Tammy and Amnon Shashua, "The Quotient Image: Class Based Re-rendering and Recognition With Varying Illuminations," The Hebrew University of Jerusalem, Computer Science TR-99-1, Jan. 1999, pp. 1-12.

Jiang, Dalong et al., Animating Arbitrary Topology 3D Facial Model Using the MPEG-4 FaceDefTables, Proceedings of IEEE International Conference on Multi-Modal Interface, 2002, pp. 517-522.

Blanz, Voker and Vetter, Thomas, "A Morphable Model for the Synthesis of 3D Faces," Proceedings of ACM SIGGRAPH, 1999, pp. 187-194.

Zhang, Ruo et al., "Shape from Shading. A Survey," IEEE Transactions on Pattern Analysis and Machine Intelligence, vol. 21, No. 8, Aug. 1999.

Lai, Jian Huang et al., "Face Recognition Using Holistic Fourier Invariant Features," 2000 Pattern Recognition Society, Published by Elsevier Science, Ltd., Pattern Recognition 34 (2001) 95-109.

Terzopoulos, Demetri, "The Computation of Visible-Surface Representations," IEEE Transactions on Pattern Analysis and Machine Intelligence, vol. 10, No. 4, Jul. 1988.

Pentland, Alex et al., "View-Based and Modular Eigenspaces for Face Recognition," M.I.T. Media Laboratory Perceptual Computing Section Technical Report No. 245, Appeared in IEEE Conference on Computer Vision & Pattern Recognition, 1994.

Lang, Chao-yi, "Kriging Interpolation," Accessed May 9, 2006 (7 pages) http://www.nbb.cornell.edu/neurobio/land/OldStudentProjects/cs490-94to95/clang/kriging.html.

Martinzez, A.R. and Benavente, R., "The AR Face Database," Technical Report 24, Computer Vision Center, Barcelona, Spain, Jun. 1998.

* cited by examiner

METHOD AND SYSTEM FOR CONSTRUCTING A 3D REPRESENTATION OF A FACE FROM A 2D REPRESENTATION

TECHNICAL FIELD

The described technology relates generally to representing objects to assist in object recognition and particularly to representing faces to assist in face recognition.

BACKGROUND

The automatic recognition of faces is becoming increasingly important in several applications such as security and processing of digital photographs. In security applications, automatic face recognition can be used to identify persons of interest or to confirm the identity of a person seeking access to a resource. In digital photography applications, automatic face recognition can be used to identify the people within each photograph. The knowledge of which people are in which photographs can be used to help organize the collection.

Conventional techniques for automatic face recognition do not perform satisfactorily for various reasons. Although automatic face recognition when presented with an image condition of frontal face with indoor lighting can be performed with 90% accuracy, the accuracy reduces significantly when the image conditions, such as pose, illumination, and expression, vary. For example, when a face of an image is at a 45 degree angle with an exaggerated expression (e.g., big smile) under poor illumination, it can be extremely difficult to automatically recognize the identity of the face.

Conventional techniques use various strategies to automatically recognize faces. Some techniques attempt to normalize target faces to a standard image condition. Some 2D techniques normalize target faces to an image condition that is the same as the image condition of a corpus of faces. Some 3D techniques attempt to warp non-frontal faces to frontal faces using a cylinder geometry. These techniques may train a classifier using the corpus or check specific features that are invariant to different image conditions. Because the 2D techniques do not consider specific structures of faces, their results can be less than acceptable. Although the 3D techniques overcome this limitation, they may require manual labeling or may be time-consuming.

Other techniques utilize a corpus with multiple images of a face covering different image conditions. These techniques then try to match a target face to one of the multiple images. It can be, however, very time-consuming to create the corpus or difficult to collect multiple images when the persons of interest are not readily available. Moreover, in practice, since the images of target faces may not match the image conditions of the corpus, the results of recognition can be less than acceptable.

It would be desirable to have a technique for automatic recognition of faces or other objects that would overcome some of the limitations of these conventional techniques.

SUMMARY

A method and system for generating 3D images of faces from 2D images, for generating 2D images of the faces at different image conditions from the 3D images, and for recognizing a 2D image of a target face based on the generated 2D images is provided. The recognition system provides a 3D model of a face that includes a 3D image of a standard face under a standard image condition and parameters indicating variations of an individual face from the standard face. To generate the 3D image of a face, the recognition system inputs a 2D image of the face under a standard image condition. The recognition system then calculates parameters that map the points of the 2D image to the corresponding points of a 2D image of the standard face. The recognition system uses these parameters with the 3D model to generate 3D images of the face at different image conditions. The recognition system also texture maps the 2D image to the 3D image and interpolates for points occluded in the input 2D image. The recognition system generates 2D images derived from a 3D image of the face at different image conditions and uses those 2D images to recognize the face of a target image.

DETAILED DESCRIPTION

Figure 1:
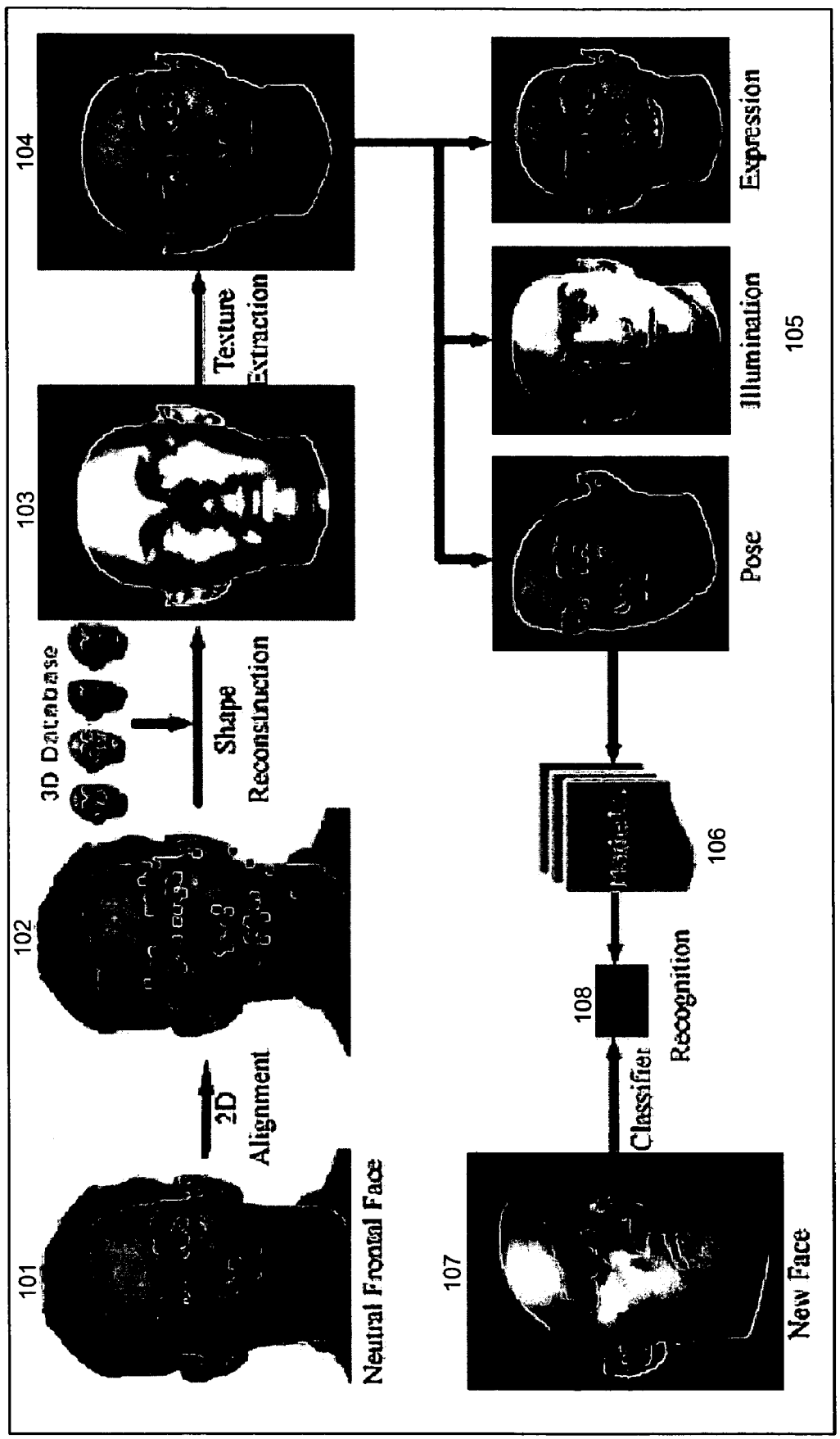
FIG. 1 is a diagram that illustrates the processing of the recognition system in one embodiment.

A method and system for generating 3D images of faces from 2D images, for generating 2D images of the faces at different image conditions from the 3D images, and for recognizing a 2D image of a target face based on the generated 2D images is provided. In one embodiment, the recognition system provides a 3D model of a face that includes a 3D image of a standard face and parameters indicating variations of an individual face from the standard face. The recognition system may generate a 3D image of a standard face by analyzing a corpus of 3D images of faces that are presented in a standard image condition such as a frontal pose with neutral expression and with normal illumination. To generate the 3D image of a face, the recognition system inputs a 2D image of the face under the standard image condition. The recognition system identifies feature points, such as various contour points of the face, eye centers, mouth ends, and nose tip, of the 2D image. The recognition system then calculates parameters that map identified feature points of the 2D image to the corresponding feature points of a 2D image of the standard face. The recognition system also texture maps the 2D image to the 3D image and interpolates for points occluded in the input 2D image. The recognition system uses these parameters with the 3D model to generate 3D images of the face at different image conditions. The recognition system generates 2D images derived from a 3D image of the face at different image conditions. The recognition system applies this process to a collection of 2D images of faces under a standard image condition to generate a corpus of 2D images of the faces under varying image conditions. Thus, the recognition system uses the 3D model to generate 2D images of faces under various image conditions. To recognize a target image, the recognition system identifies which 2D image of the corpus best matches a 2D image of a target face. The recognition system may alternatively generate the 2D images of a face under the various image conditions dynamically from the 3D image using the 3D model and the parameters for that face. In this way, the recognition system can automatically generate 2D images of faces under various image conditions and use those 2D images to recognize a target face in a 2D image.

In one embodiment, the recognition system inputs a 2D image of a face with a standard image condition. The recognition system then identifies the various feature points of the 2D image using an alignment algorithm such as that described in S. C. Yan, M. J. Li, H. J. Zhang and Q. S. Cheng, "Ranking Prior Likelihood Distributions for Bayesian Shape Localization Framework," Proceeding of the 9th International Conference on Computer Vision, France, Nice, pp. 51-58, Oct. 13-16, 2003. The recognition system uses a morphable 3D model of a face to generate the 3D images of a face under various image conditions. The recognition system represents a 3D image with a face vector $S=(X_1, Y_1, Z_1, X_2, \ldots Y_n, Z_n)^T \in \Re^{3n}$ in which X, Y, and Z are coordinates of the n points of the 3D image. The recognition system bases the 3D model on the 3D image of a standard face under standard image conditions. The recognition system may generate the standard face from a corpus of 3D images as the average of the images. The recognition system applies Principal Component Analysis to more compactly represent the 3D image of the standard face to reduce the computational complexity. The recognition system represents the 3D model by the following equation:

$$S' = \bar{S} + P\vec{\alpha}, \qquad (1)$$

where $\bar{S}$ is the shape vector of the standard face, $P \in \Re^{3n \times m}$ is the matrix of the first m eigenvectors of $\bar{S}$ derived from the application of the Principal Component Analysis, and $\vec{\alpha} = (\alpha_1, \alpha_2, \ldots, \alpha_m)^T \in \Re^m$ are the coefficients or parameter vector of an individual face. The recognition system generates the parameters for each face that is represented in the corpus.

To calculate the parameters, the recognition system uses t two-dimensional feature points to reduce the computational complexity and to filter out points that have semantic meaning and can be corresponded to points in the 3D face model (e.g., eye corners, nose tip, and mouth corners). The recognition system represents the feature points by the 2D face vector $S_f = (X_1, Y_1, X_2, \ldots, X_t, Y_t)^T \in \Re^{2t}$, where X and Y are coordinates of the feature points taken from the 3D face vector on the face. The recognition system represents the 2D model corresponding to Equation 1 by the following equation:

$$S'_f = \bar{S}_f + P_f \vec{\alpha}, \qquad (2)$$

where $\bar{S}_f \in \Re^{2t}$ and $P_f \in \Re^{2t \times m}$ are the X and Y coordinates of the feature points of $\bar{S}$ and P, respectively.

Since an input 2D image whose parameters are to be calculated may be in a different coordinate system than the standard face, the recognition system transforms the standard face from the standard coordinate system to the input coordinate system. The recognition system represents the transformation by the following equation:

$$S''_f = cS'_f + T, \qquad (3)$$

where $S''_f$ represents the face vector of the input 2D image, $S'_f$ represents the transformed face vector, $T \in \Re^{2t}$ represents a translation vector, and $c \in \Re$ represents a scale factor. Since the 2D image and 3D model are both frontal, the recognition system need not apply a matrix to rotate the 2D image. The recognition system derives the parameter vector $\vec{\alpha}$ from Equation 2 using the following equation:

$$\vec{\alpha} = (P_f^T P_f)^{-1} P_f^T (S'_f - \bar{S}_f). \qquad (4)$$

To avoid outliers, the recognition system applies priors to constrain the parameter vector using the following equation:

$$\vec{\alpha} = (P_f^T P_f + \lambda \Lambda^{-1})^{-1} P_f^T (S'_f - \bar{S}_f) \qquad (5)$$

where $\Lambda = \mathrm{diag}(v_1, v_2, \ldots, v_m)$, $\lambda$ represents a weighting factor, and $v_i$ represents the ith eigenvalues calculated when the recognition system applied Principal Component Analysis to the 3D image of the standard face.

The recognition system solves for the parameter vector iteratively by calculating a transformation for the coordinate systems, transforming the input 2D face vector using Equation 3, calculating the parameter vector from the transformed input 2D face vector using Equation 5, and then recalculating a new input 2D face vector using Equation 2. The recognition system repeats these steps until the parameter vector converges on a solution. The recognition system initially sets $S'_f$ to $\bar{S}_f$ for calculating the transformation. The recognition system then calculates the average offsets of all t feature points of $S''_f$ to the origin along the X and Y axes using the following equation:

$$(T_x, T_y)^T = \frac{1}{t} \sum_{i=1}^{t} S_{f_i}^n \qquad (6)$$

where $T_x$ and $T_y$ represent the average offsets for X and Y respectively and $T = (T_x, T_y, \ldots, T_x, T_y)^T$ represents the translation vector. The recognition system represents the scale factor by the following equation:

$$c = \frac{\sum_{i=1}^{t} \langle S_{f_i}^n - (T_x, T_y)^T, S'_{f_i} \rangle}{\sum_{i=1}^{t} \|S'_{f_i}\|^2} \qquad (7)$$

The recognition system then calculates a transformed face vector $S'_f$ using Equation 3. The recognition system then calculates the parameter vector $\vec{\alpha}$ using Equation 5 and then calculates a new face vector $S'_f$ by applying the parameter vector $\vec{\alpha}$ to Equation 2. The recognition system repeats this processing until the parameter vector $\vec{\alpha}$ generally converges to a fixed value. The recognition system then uses the parameter vector $\vec{\alpha}$ in Equation 1 to generate the 3D image of the face at the feature points. The recognition system then aligns certain feature points with the 2D image and interpolates the non-feature points of the 3D image.

The recognition system texture maps the 2D image of the input face to the 3D image by projecting the 2D image orthogonally onto the 3D image. The recognition system can also use a Principal Component Analysis to reduce the complexity of the mapping. After the 2D image is directly mapped to the 3D image, it is possible that no color information is available for some points because they are occluded in the frontal face image. The recognition system uses a linear interpolation algorithm to generate the missing color information from known color information. In one embodiment, the recognition system calculates missing color information from known color information that is radially located from the points with missing color inferred. The recognition system calculates the missing color information using the following equation:

$$C(R, G, B) = \frac{\sum_{i=1}^{n} (\lambda_1, C_1(R, G, B))}{\sum_{i=1}^{n} \lambda_i}, \qquad (8)$$

where $P_i$(i=1, 2, ..., n) represents the points at which the radials from point P intersect points of known color information, C(R, G, B) represents the RGB color of a point, and $\lambda_i = 1/D_i$ where $D_i$ is the distance between P and $P_i$. If $P_i$ is at the edge of the image, then $\lambda_i$ is set to 0.

FIG. 1 is a diagram that illustrates the processing of the recognition system in one embodiment. The recognition system inputs 101 a 2D image of the face under a standard image condition. The recognition system then aligns 102 the image to identify the feature points of the image. The recognition system then constructs 103 the 3D image for the input face using the algorithm described above. The recognition system texture maps 104 the 2D image to the constructed 3D image. After the 3D image is created, the recognition system can use standard techniques to generate 105 additional 3D images under various image conditions. The recognition system may map 106 these 3D images to 2D images and store them in a database. To recognize a target face, the recognition system inputs 107 the 2D image of the target face and then compares it to the 2D images of the database to find the closest matching 2D image in the database. The recognition system recognizes 108 that person of that 2D image as the person of the target face.

Figure 2:
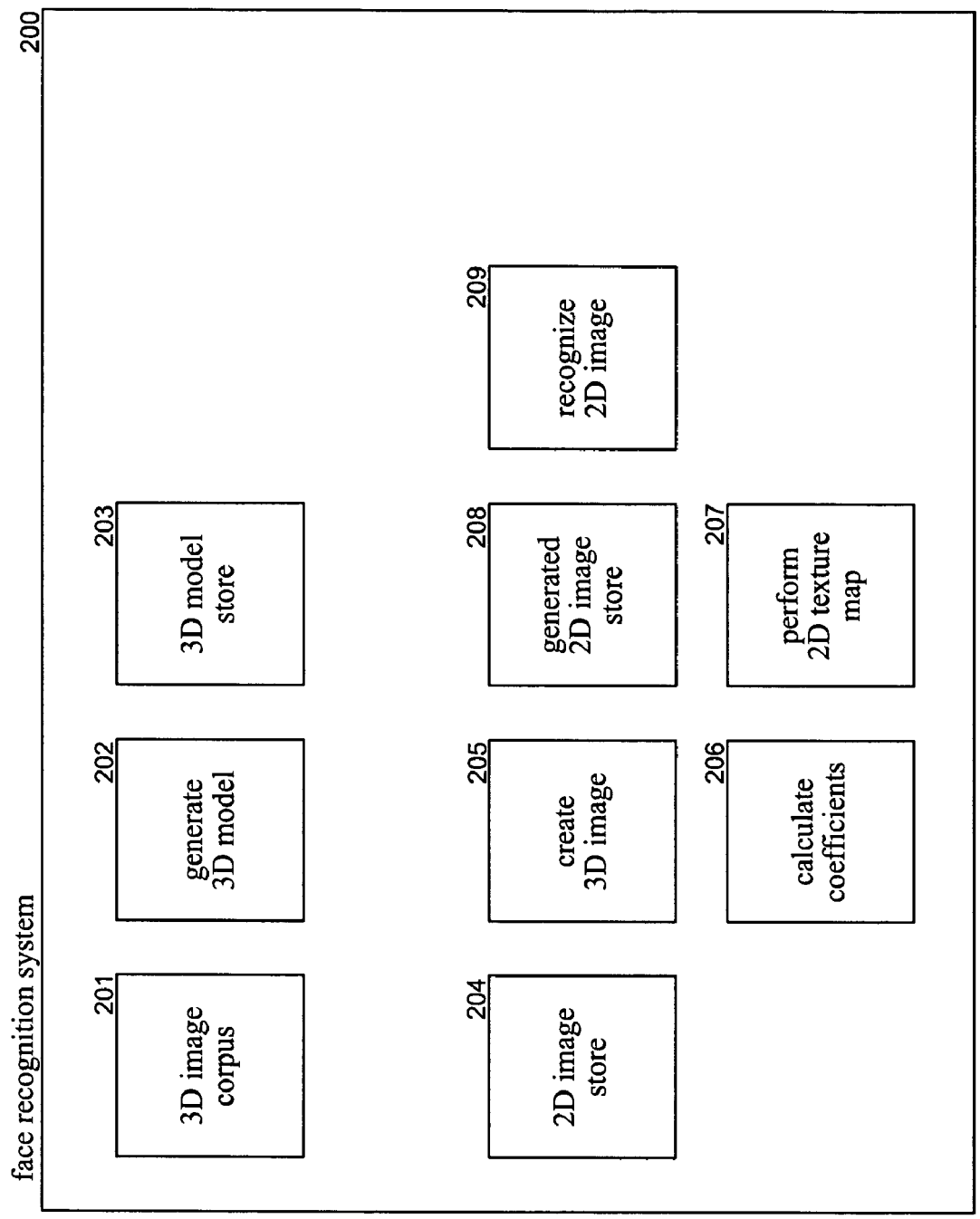
FIG. 2 is a block diagram that illustrates components of the face recognition system in one embodiment.

FIG. 2 is a block diagram that illustrates components of the face recognition system in one embodiment. The recognition system 200 includes a 3D image corpus 201, a generate 3D model component 202, and a 3D model store 203. The generate 3D model component generates a 3D image of a standard face by averaging the 3D images in the corpus. The component may also normalize the 3D images of the corpus to the standard image condition. The component generates an eigenvector matrix and eigenvalues for the 3D image of the standard face. The component stores the 3D image of the standard face and the eigenvector matrix and eigenvalues in the 3D model store. The recognition system also includes a 2D image store 204, a create 3D image component 205, a calculate coefficients component 206, a perform 2D texture map component 207, a generated 2D image store 208, and a recognize 2D image component 209. The 2D image store contains the 2D images under standard image conditions of faces to be recognized by the recognition system. The create 3D image component applies the algorithm as described above to generate the 3D images corresponding to the 2D images of the 2D image store. The component invokes the calculate coefficients component to perform the iterations of the algorithm and the perform 2D texture map component to perform the texture mapping. The component stores the 2D images in the generated 2D image store. The recognize 2D image component is invoked to recognize a target face of a 2D image based on the images of the generated 2D image store.

The computing device on which the recognition system is implemented may include a central processing unit, memory, input devices (e.g., keyboard and pointing devices), output devices (e.g., display devices), and storage devices (e.g., disk drives). The memory and storage devices are computer-readable media that may contain instructions that implement the recognition system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the recognition system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The recognition system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
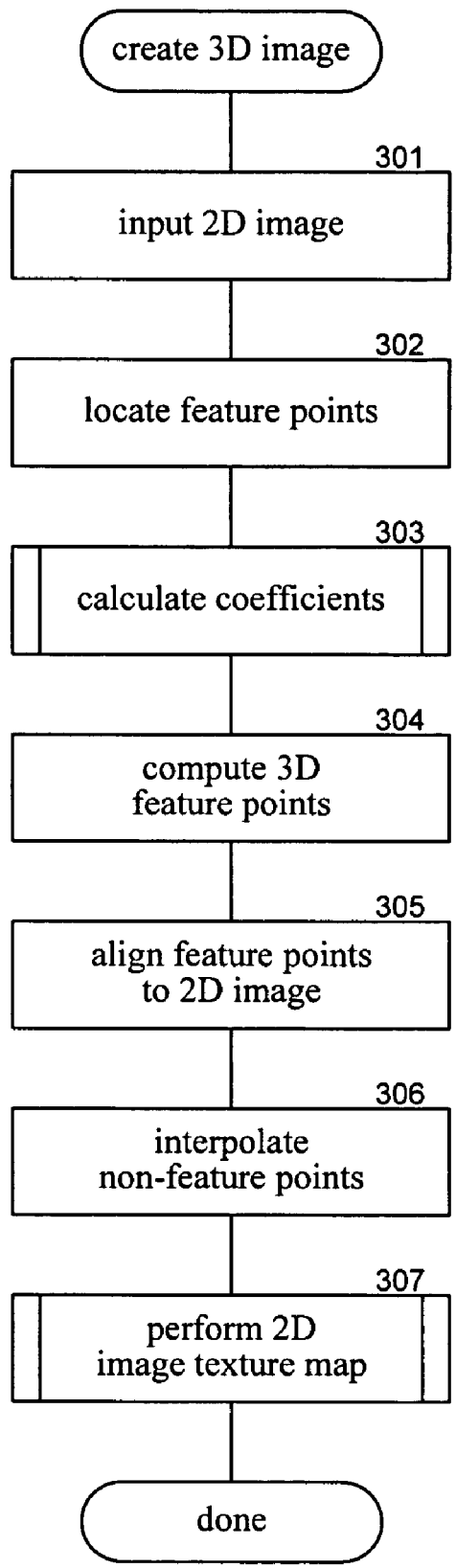
FIG. 3 is a flow diagram that illustrates the processing of the create 3D image component of the recognition system in one embodiment.

FIG. 3 is a flow diagram that illustrates the processing of the create 3D image component of the recognition system in one embodiment. The component inputs a 2D image of a face and generates a 3D image of the face. The component may also generate 2D images of the face under varying image conditions based on the 3D image of the face. In block 301, the component inputs a 2D image of a face. In block 302, the component locates the feature points of the input 2D image. In block 303, the component invokes the calculate coefficient component to calculate the parameters for the 3D model that match the input 2D image. In block 304, the component computes the 3D feature points of the 3D image using the 3D model and the calculated parameters. In block 305, the component aligns the feature points to the 2D image. In block 306, the component interpolates the non-feature points of the 3D image. In block 307, the component invokes the perform 2D texture map component to texture map the input 2D image to the generated 3D image. The component may use standard techniques to generate 3D images under varying image conditions from the generated 3D image. The component may then generate 2D images from the 3D images and store them in the generated 2D image store for use in recognizing a target face. The component then completes.

Figure 4:
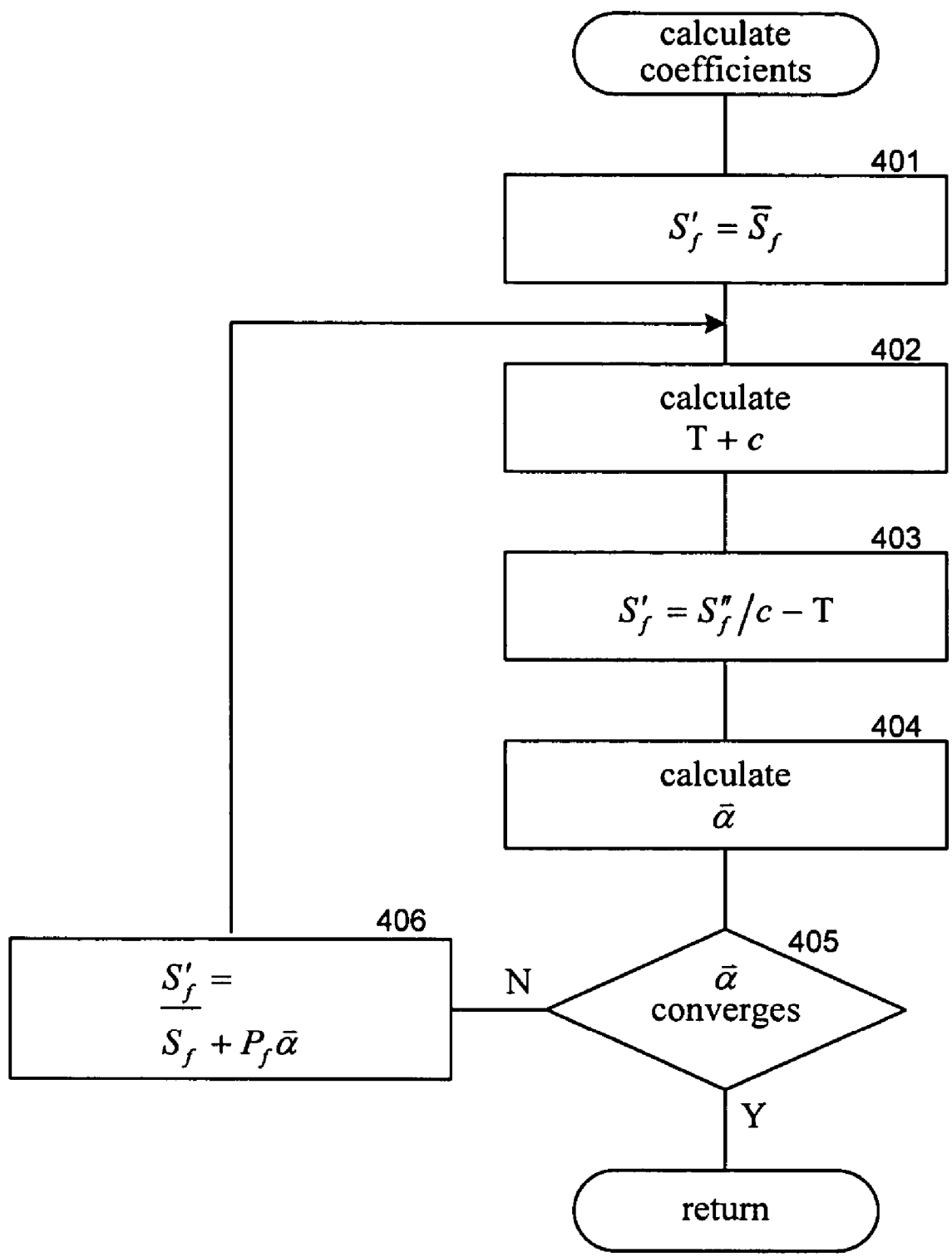
FIG. 4 is a flow diagram that illustrates the processing of the calculate coefficients component of the recognition system in one embodiment.

FIG. 4 is a flow diagram that illustrates the processing of the calculate coefficients component of the recognition system in one embodiment. The component loops performing the algorithm described above until the parameter vector converges on a solution. The algorithm may terminate on other conditions such as the face vector converging, after a fixed number of iterations, after a fixed time, and so on. In block 401, the component initializes a face vector to the average face vector. In block 402, the component calculates the transform vector and the scale factor using Equations 6 and 7 based on the face vector. In block 403, the component calculates a new face vector applying the transform vector and scale factor in Equation 3. In block 404, the component calculates the parameter vector using Equation 5. In decision block 405, if the calculated parameter vector is within a threshold of the parameter vector calculated during the previous iteration, then the iterations have converged on a solution and the component returns, else the component continues at block 406. In block 406, the component recalculates the face vector using the 2D model of Equation 2 and then loops to block 402 to perform the next iteration.

Figure 5:
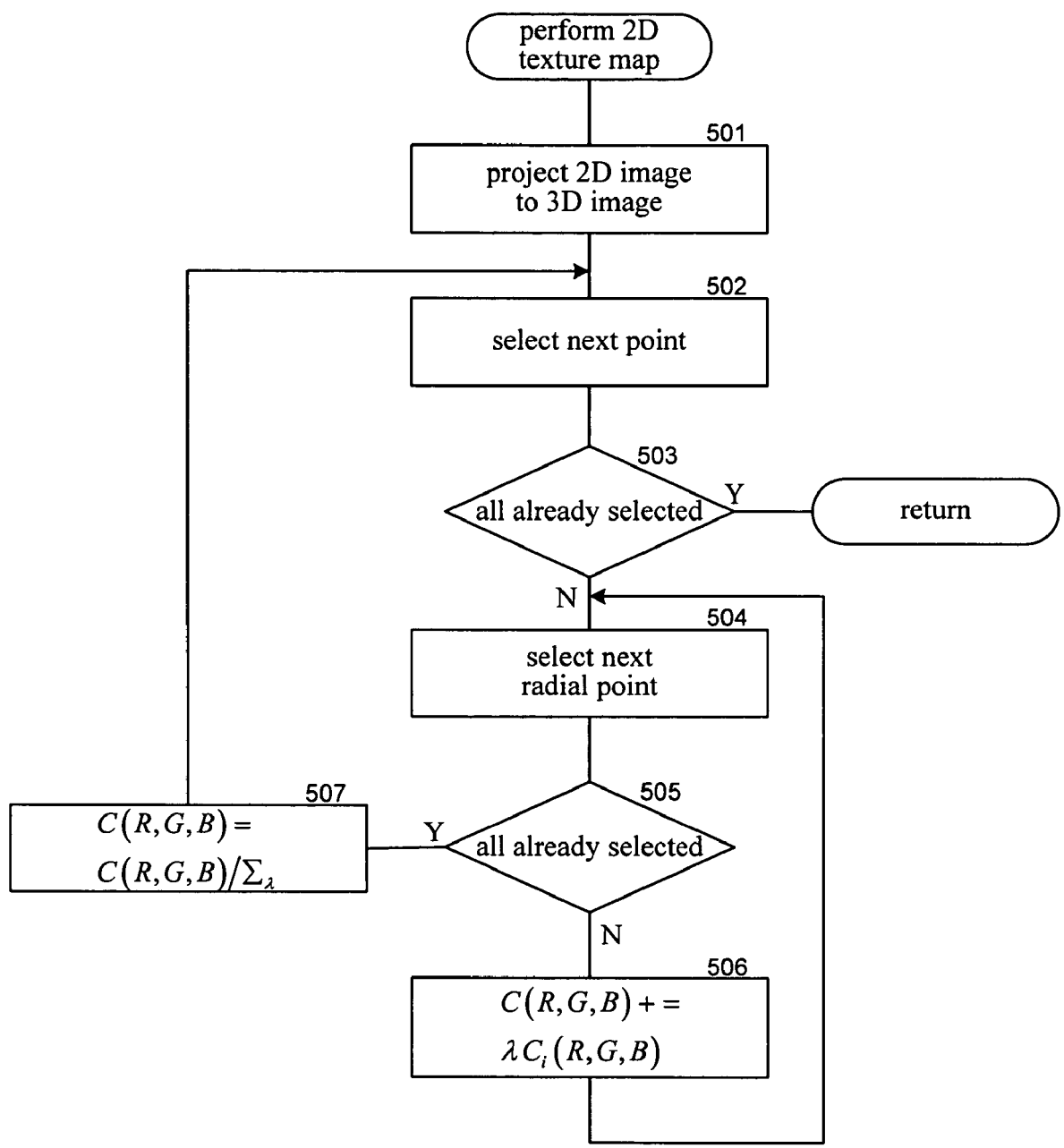
FIG. 5 is a flow diagram that illustrates the processing of the perform 2D texture map component in one embodiment.

FIG. 5 is a flow diagram that illustrates the processing of the perform 2D texture map component in one embodiment. The component orthogonally projects the 2D image onto the 3D image and then fills in missing color information derived from known color information. In block 501, the component projects the 2D image onto the 3D image. In blocks 502-507, the component loops selecting each point with missing color information and interpolating new color information for that point. In block 502, the component selects the next point that is missing color information. In decision block 503, if all such points have already been selected, then the component returns, else the component continues at block 504. In blocks 504-506, the component loops accumulating the color information of radial points with known color information. In block 504, the component selects the next radial point with known color information. In decision block 505, if all the radial points have already been selected, then the component continues at block 507, else the component continues at block 506. In block 506, the component accumulates the color information using a weighting factor based on the distance of the radial point from the selected point. The component then loops to block 504 to select the next radial point for the selected point. In block 507, the component normalizes the accumulated color information by the sum of the weights and then loops to block 502 to select the next point.

Figure 6:
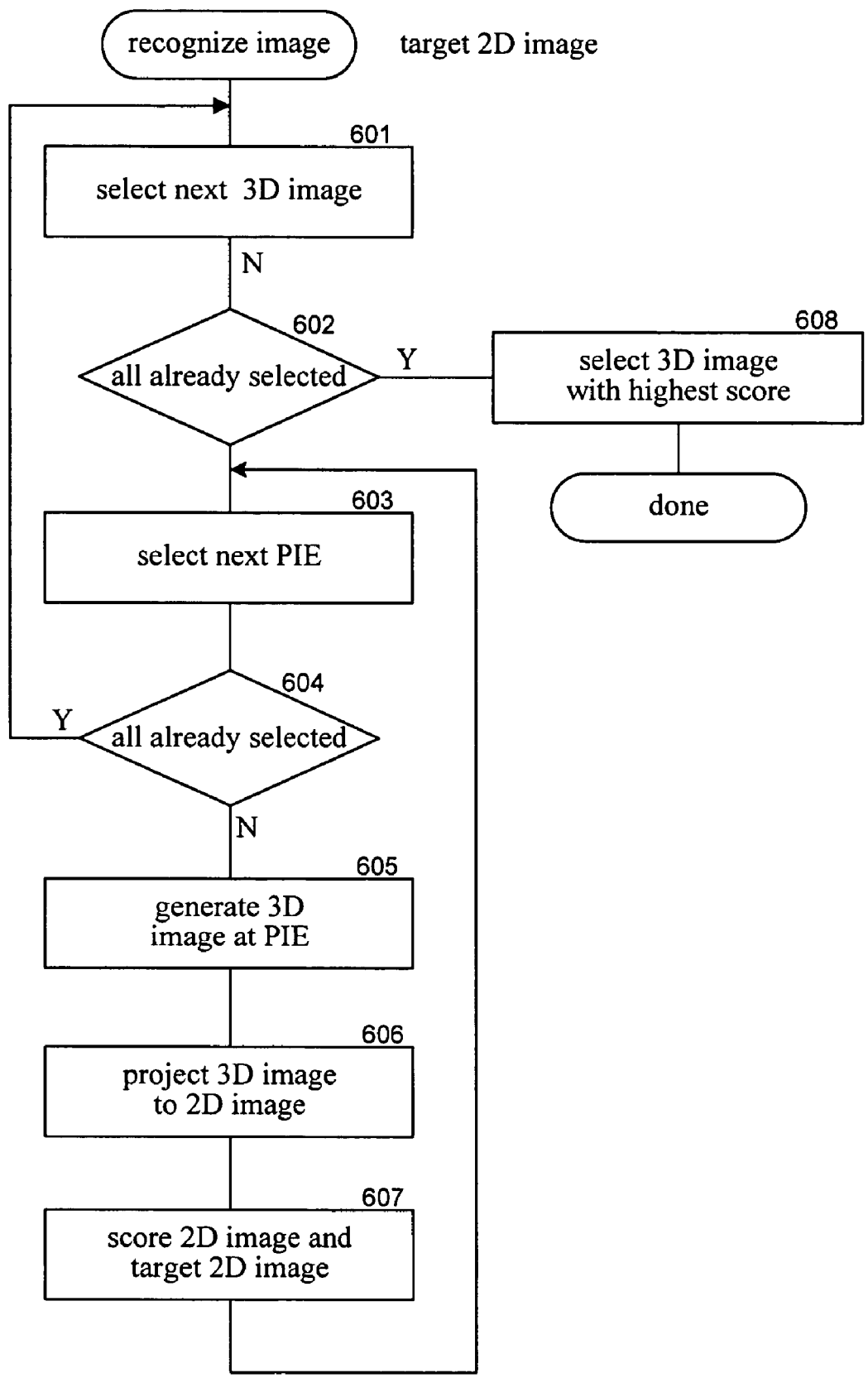
FIG. 6 is a flow diagram that illustrates the processing of the recognize 2D image component of the recognition system in one embodiment.

FIG. 6 is a flow diagram that illustrates the processing of the recognize 2D image component of the recognition system in one embodiment. The component is passed a 2D image of a target face and determines which 2D image generated from the 3D images under varying image conditions most closely matches the target face. Alternatively, the recognition system may store the 2D images in the generated 2D image store rather than recalculate the 2D images in this component. In block 601, the component selects the next 3D image. In decision block 602, if all the 3D images have already been selected, then the component continues at block 608, else the component continues at block 603. In block 603, the component selects the next image condition. In decision block 604, if all the image conditions have already been selected for the selected 3D image, then the component loops to block 601 to select the next 3D image, else the component continues at block 605. In block 605, the component generates a 3D image under the selected image condition using conventional techniques. In block 606, the component projects the generated 3D image onto a 2D image. In block 607, the component scores the closeness of the projected 2D image to the 2D image of the target face. The component then loops to block 603 to select the next image condition. In block 608, the component selects the 3D image with the highest score as representing the recognition of the target face. The component then completes.

From the foregoing, it will be appreciated that specific embodiments of the recognition system have been described herein for purposes of illustration, but that various modifications may be made without deviating from the spirit and scope of the invention. The recognition system can be used to recognize objects of various types other than faces, such as vehicles, armament, and so on. Accordingly, the invention is not limited except as by the appended claims.

We claim:

1. A method in a computer system for generating a 3D image of an object, the method comprising:
   providing a 3D model of an object, the 3D model including a 3D image of a standard object and parameters indicating variations of an individual object;
   receiving a 2D image of the object;
   locating feature points of the 2D image of the object;
   calculating parameters that map the located feature points of the 2D image to feature points of a 2D representation of the 3D image of the standard object;
   computing 3D feature points of the 3D image of the object using the provided 3D model and the calculated parameters;
   after computing the 3D feature points, interpolating 3D non-feature points of the 3D image from the computed 3D feature points; and
   after the 3D non-feature points of the 3D image is interpolated, texture mapping the 2D image of the object to the 3D image with the computed 3D feature points and interpolated 3D non-feature points
   wherein the 3D model is represented by the following equation:

$$S' = \overline{S} + P\vec{\alpha}$$

where $S=(X_1, Y_1, Z_1, X_2, \ldots Y_n, Z_n)^T \in \Re^{3n}$, X, Y, and Z are coordinates of the n points, $\overline{S}$ represents the standard object, $P \in \Re^{3n \times m}$ is the matrix of the first m eigenvectors of $\overline{S}$, and $\vec{\alpha} = (\alpha_1, \alpha_2, \ldots, \alpha_m)^T \in \Re^m$ are the parameters.

2. The method of claim 1 including aligning the 2D image of the object with the feature points.

3. The method of claim 1 including interpolating non-feature points of the 3D image of the object based on the set feature points.

4. The method of claim 1 including interpolating the texture map in an area occluded by the 3D image of the object.

5. The method of claim 1 wherein the feature points in the 2D representation of the 3D image of the standard object are two of the three coordinates of the 3D image of the standard object.

6. The method of claim 1 including generating the 3D image of the standard object by normalizing 3D images of objects and taking the average of the 3D images.

7. The method of claim 6 wherein the 3D model includes a 3D image of a standard object and an eigenvector matrix of the 3D image of the standard object adjusted by a parameter vector.

8. The method of claim 1 including:
   receiving a 2D image of a target object;
   generating 3D images of the object at different image conditions; and
   comparing the 2D image of the target object with 2D images derived from the generated 3D images to determine whether the target object matches the object.

9. A computer-readable medium containing instructions for controlling a computer system to generate a 3D image of a face, by a method comprises:
   providing a 3D model for a face, the 3D model combining 3D points of a standard face and parameters, the parameters representing variations of an individual face from the average face;
   receiving a 2D image of a face;
   locating feature points of the 2D image of the face;

calculating parameters that map the located feature points of the 2D image to a 2D representation of the 3D points of the standard face; and computing points of the 3D image of the face based on the provided model using the calculated parameters; and after computing the points of the 3D image, texture mapping the 2D image of the face to the computed points of the 3D image of the face wherein the 3D model is represented by the following equation:

$$S' = \overline{S} + P\vec{\alpha}$$

where $S=(X_1, Y_1, Z_1, X_2, \ldots Y_n, Z_n)^T \in \Re^{3n}$, X, Y, and Z are coordinates of the n points, $\overline{S}$ represents the standard object, $P \in \Re^{3n \times m}$ is the matrix of the first m eigenvectors of $\overline{S}$, and $\vec{\alpha} = (\alpha_1, \alpha_2, \ldots, \alpha_m)^T \in \Re^{3n \times m}$ are the parameters.

where $S=(X_1, Y_1, Z_1, X_2, \ldots Y_n, Z_n)^T \in \Re^{3n}$, X, Y, and Z are coordinates of the n points, $\overline{S}$ represents the standard face, $P \in \Re^{3n \times m}$ is the matrix of the first m eigenvectors of $\overline{S}$, and $\vec{\alpha} + (\alpha_1, \alpha_2, \ldots, \alpha_m)^T \in \Re^m$ are the parameters.

10. The computer-readable medium of claim 9, wherein the 3D model uses a subset of the $n$ points that represents feature points.

11. The computer-readable medium of claim 9 including interpolating non-feature points of the 3D image of the face based on feature points set based on the provided model and parameters.

12. The computer-readable medium of claim 9, including interpolating the texture map in an area occluded by the 3D image of the face.

13. The computer-readable medium of claim 9 including:
receiving a 2D image of a target face;
generating 3D images of the face at different image conditions; and
comparing the 2D image of the target face with 2D images derived from the generated 3D images to determine whether the target face matches the face.

14. A computer-readable medium containing instructions for controlling a computer system to generate a 3D image of a face, comprising:

a 3D model for a face, the 3D model combining 3D points of a standard face and parameters, the parameters representing variations of an individual face from the standard face;

a 2D image of a face;

a component that calculates parameters that map points of the 2D image to 2D points derived from the 3D points of the standard face;

a component that computes points of the 3D image of the face based on the provided model using the calculated parameters;

a component that texture maps the 2D image of the face onto the 3D image of the face; and a component that generates 2D images of the face from a texture mapped 3D image of the face at varying image conditions wherein the 3D model is represented by the following equation:

$$S' = \overline{S} + P\vec{\alpha}$$

points, $\overline{S}$ represents the standard face, $P \in \Re^{3n \times m}$ is the matrix of the first m eigenvectors of $\overline{S}$, where $S=(X_1, Y_1, Z_1, X_2, \ldots Y_n, Z_n)^T \in \Re^{3n}$, X, Y, and Z are coordinates of the n and $\vec{\alpha} = (\alpha_1, \alpha_2, \ldots, \alpha_m)^T \in \Re^m$ are the parameters.

15. The computer-readable medium of claim 14 wherein an image condition is a pose, an illumination, or an expression.

16. The computer-readable medium of claim 14 including a component that interpolates non-feature points of the 3D image of the face based on set feature points.

* * * * *